United States Patent [19]
Yamada et al.

[11] Patent Number: 5,712,956
[45] Date of Patent: Jan. 27, 1998

[54] FEATURE EXTRACTION AND NORMALIZATION FOR SPEECH RECOGNITION

[75] Inventors: Eiko Yamada; Hiroaki Hattori, both of Tokyo, Japan

[73] Assignee: NEC Corporation, Tokyo, Japan

[21] Appl. No.: 381,328

[22] Filed: Jan. 31, 1995

[30] Foreign Application Priority Data

Jan. 31, 1994 [JP] Japan .................................. 6-009026

[51] Int. Cl.$^6$ ........................................................ G10L 9/16
[52] U.S. Cl. ...................... 395/2.43; 395/2.13; 395/2.33
[58] Field of Search ................................. 395/2.43, 2.13, 395/2.12, 2.33, 2.14, 2.64, 2.42, 2.53, 2.57, 2.62, 2.35, 2.36, 2.37, 2.39

[56] References Cited

U.S. PATENT DOCUMENTS

| | | | |
|---|---|---|---|
| 4,520,500 | 5/1985 | Mizuno et al. | 395/2.57 |
| 4,625,286 | 11/1986 | Papamichalis et al. | 395/2.28 |
| 4,837,828 | 6/1989 | Watari | 395/2.13 |
| 4,852,181 | 7/1989 | Morito et al. | 395/2.42 |
| 5,001,761 | 3/1991 | Hattori | 395/2.33 |
| 5,555,320 | 9/1996 | Irie et al. | 382/225 |
| 5,604,839 | 2/1997 | Acero et al. | 395/2.43 |
| 5,617,508 | 4/1997 | Reaves | 395/2.42 |

FOREIGN PATENT DOCUMENTS

| | | | |
|---|---|---|---|
| 0 374 604 | 6/1990 | European Pat. Off. | G06K 9/64 |
| 58-196595 | 11/1983 | Japan . | |

OTHER PUBLICATIONS

Nakajima et al., "Estimation of Vocal Tract Sectional Area Functions by Adaptive Inverse Filter Method", Proc., Accoustical Society of Japan, May, 1973, pp. 163–164.

Furui, "Digital Speech Processing", Tokai University Publishing Society, 1985, pp. 44–47.

Hino, "Spectrum Analysis", Asakura Bookstore, 1977, pp. 62–63.

Nakagawa, "Speech Recognition by Probability Models", The Institute of Electronics, Information and Communication Engineers, 1988, pp. 44–46.

Nakajima et al., "Estimation of vocal tract area functions by adaptive inverse filtering methods", Bulletin of the Electrotechnical Laboratory, 1973, Japan, vol. 37. No. 4, pp. 462–481.

*Primary Examiner*—Allen R. MacDonald
*Assistant Examiner*—Donald L. Storm
*Attorney, Agent, or Firm*—Foley & Lardner

[57] ABSTRACT

Speech data is converted into logarithmic spectrum data and orthogonally transformed to develop feature vectors. Normalization coefficient data and unit vector data are stored. An inner product of the feature vector data and the unit vector data is calculated. The inner product may be the average of inner products for a word or a sentence, or may be a regressive average of them. A normalization vector, which corresponds to a second or higher order curve obtained by least-square error approximation of the speech data on logarithmic spectrum space, is calculated on the transformed feature vector space by using the inner product, the normalization coefficient data, and the unit vector data. Normalization of the feature vectors is performed by subtracting the normalization vector from the feature vectors on the transformed feature vector space. Then, a recognition is performed based on the normalized feature vector.

8 Claims, 2 Drawing Sheets

FEATURE EXTRACTION AND NORMALIZATION FOR SPEECH RECOGNITION

BACKGROUND OF THE INVENTION

The present invention relates to a speech recognition apparatus and more particularly to a speech recognition apparatus having improved spectrum normalization.

In the field of speech recognitions, researches and investigations are being made on analysis methods for obtaining higher recognition rate for various input systems having different frequency characteristics, i.e. microphones and telephones. An example of such method is a tilt compensation method based on a first-order regression line (as disclosed in Japanese Patent Laid-open Publication No. Showa 58-196595, hereinafter referred to as Literature 1). In this method, spectrum tilt compensation is performed by deriving first-order regression line approximation to the spectrum based on the least-square method and then subtracting the approximated first-order regression line from the original spectrum. It is disclosed that this method eliminates the telephone line characteristic fluctuations in speech.

Another method of spectrum compensation with curve is disclosed as a critical damping system (Nakajima & Omura, "Estimation of Vocal Tract Sectional Area Functions by Adaptive Inverse Filter Method", Proc., Acoustical Society of Japan, May, 1973, hereinafter referred to as Literature 2). This method has an object of extracting speech waves having smooth frequency characteristics from the speech waveforms. Here, the sampled value $X_t$ at time t is expressed, using a prediction coefficient $\epsilon_1$, by the first order combination of two preceding sampled values $X_{t-1}$ and $X_{t-2}$ as shown in the following equation.

$$\hat{x}_t = \epsilon_1 x_{t-1} - \frac{\epsilon_1^2}{4} x_{t-2}$$

Here, $\epsilon_1$ is determined such that the sum of the squares of the difference between the predicted and actual values is minimum. That is, the spectrum compensation is performed by least-square method on the time domain. Thus the speech waves having smooth frequency characteristics may be obtained.

As stated in the above Literature 1, the tilt compensation method based on the first-order regression line is provided. However, in the transmission systems with complicated line characteristics, i.e. telephone line, there is a problem that the first-order regression line is incapable of permitting sufficient compensation.

According to Literature 2, spectrum compensation with curve is performed. However, a great amount of calculations is required due to the compensation calculation on the waveform level. For example, the critical damping system of a second degree will be described. Denoting the number of analysis window width points by p, for deriving the prediction coefficient $\epsilon_1$, it is necessary to solve a third order equation as shown below.

$$C_{22}\epsilon_1^3 - 6C_{21}\epsilon_1^2 + (4C_{02} + 8C_{11})\epsilon_1 - 8C_{01} = 0$$

Where $C_{jk}$ is an element of a covariance matrix, and p is a number of analysis window width points.

$$C_{jk} = \Sigma_{i=0}^{p-1}(x_{i-j} \cdot x_{i-k-j})$$

The above calculation is performed at each time, requiring a great amount of calculations.

SUMMARY OF THE INVENTION

An object of the present invention is therefore to provide a speech recognition apparatus and method capable of coping with even complicated frequency characteristics with a small amount of calculation.

According to one aspect of the present invention, there is provided a speech recognition apparatus comprising: a speech data input unit for inputting speech data, a speech data analysis unit for converting the speech data input from the speech data input unit into logarithmic spectrum data, an orthogonal transformation unit for performing orthogonal transformation of logarithmic spectrum data obtained in the speech data analysis unit to develop feature vectors, a normalization coefficient storage unit for storing normalization coefficient data and unit vector data, an inner product calculation unit for performing inner product calculation of the feature vector data obtained in the orthogonal transformation unit and the unit vector data stored in the normalization coefficient storage unit, a normalization unit for regressively updating the inner product calculated in the inner product calculation unit and performing normalization of the feature vectors obtained in the orthogonal transformation by unit by subtracting a normalization vector, which corresponds to the second or higher order curve on the logarithmic spectrum space, from the feature vectors by using the updated inner product, the normalization coefficient data and unit vector data stored in the normalization coefficient storage unit and the feature vectors calculated in the orthogonal transformation unit, and a recognition unit for recognizing speech based on the normalized feature vector.

According to another aspect of the present invention, there is provided a speech recognition apparatus comprising: a speech data input unit for inputting speech data, a speech data analysis unit for converting the speech data input from the speech data input unit into logarithmic spectrum data, an orthogonal transformation unit for performing orthogonal transformation of logarithmic spectrum data obtained in the speech data analysis unit to develop feature vectors, a feature vector storage unit for storing a predetermined section of the feature vectors developed by the orthogonal transformation unit, a normalization coefficient storage unit for storing normalization coefficient data and unit vector data, an inner product calculation unit for performing inner product calculation of the feature vector data obtained in the orthogonal transformation unit and the unit vector data stored in the normalization coefficient storage unit, an inner product average calculation unit for calculating an average of the inner products calculated in the inner product calculation unit for a predetermined section, a normalization unit for normalizing the feature vectors with a normalization vector, which corresponds to the second or higher order curve on the logarithmic spectrum space by using the inner product average calculated by the inner product average calculation unit, the normalization coefficient data and unit vector data stored in the normalization coefficient storage unit and the feature vectors stored in the feature vector storage unit, and a recognition unit for recognizing speech based on the normalized feature vector.

In the foregoing, the normalization may be performed with an even order curve of the second or higher order having a center thereof fixed at a certain frequency or may be performed with one half of the frequency band coincident with the center of an even order curve of the second or higher order.

According to another aspect of the present invention, there is provided a speech recognition method comprising steps of: converting a speech data into logarithmic spectrum data and orthogonally transforming into feature Vectors, calculating an inner product of the feature vector data and unit vector data, updating regressively the inner product and performing the feature vector normalization by subtracting a normalization vector, which corresponds to the second or higher order curve on the logarithmic spectrum space, from the feature vectors using the updated inner product, the normalization coefficient data and unit vector data and the feature vectors, and recognizing the speech based on the normalized feature vector.

According to a further aspect of the present invention, there is provided a speech recognition method comprising steps of: converting a speech data into logarithmic spectrum data and orthogonally transforming into feature vectors, calculating an inner product of the feature vector data and unit vector data, calculating an average of the inner products for a predetermined section, performing a normalization of the feature vectors by subtracting a normalization vector, which is the second or higher order curve on the logarithmic spectrum space, from the feature vectors by using the inner product average, normalization coefficient data and unit vector data and the feature vectors, and recognizing the speech based on the normalized feature vector.

Other objects and features of the present invention will be clarified from the following description with reference to attached drawings.

PREFERRED EMBODIMENTS OF THE PRESENT INVENTION

The normalization method according to the present invention will be described in connection with the normalization with second order curve. Here, the calculation is described with respect to a certain frame number t, and expression of the frame number in the equations and symbols is omitted. Denoting the logarithmic spectrum analyzed in a speech analysis unit by $f_i$ and the second order curve as the logarithm spectrum approximation by $ai^2+bi+c$ ($i=0 \sim N-1$), the logarithmic spectrum after the normalization is expressed by equation (1).

$$\hat{f}_i = f_i - (ai^2+bi+c) \tag{1}$$

The second order curve can be derived by the least-square method, and coefficients a, b and c for minimizing the error given by equation (2) may be derived.

$$E = \sum_{i=0}^{\frac{N}{2}-1} |f_i - (ai^2+bi+c)|^2 \tag{2}$$

That is, simultaneous equations (3), (4) and (5) may be solved.

$$\frac{\partial E}{\partial a} = 0 \tag{3}$$

$$\frac{\partial E}{\partial b} = 0 \tag{4}$$

$$\frac{\partial E}{\partial c} = 0 \tag{5}$$

Where these calculations are performed on the frequency axis, a great calculation amount and a great memory amount are required.

The present invention features in that the same calculation as the spectrum normalization noted above is performed not on the frequency axis but on the axis after the orthogonal transformation. Here, the cosine transformation is shown by equation (6) as an example of the orthogonal transformation.

$$T_k = \sum_{i=0}^{N-1} \cos\left(\frac{\pi k i}{N}\right) \tag{6}$$

A characteristic quantity called a cepstrum is calculated by the cosine transformation of the logarithmic spectrum. Denoting the cepstrum after the orthogonal transformation in the orthogonal transformation unit by $F_k$ and the cepstrum after the normalization by, $$\hat{F}_k$$

the equation (1) can be written as equation (7), $$\hat{F}_k = T_k(f_i) - a \cdot T_k(i^2) - b \cdot T_k(i) - c \cdot T_k(1) \tag{7}$$

and the equation (2) can be written as equation (8).

$$E = \sum_{k=0}^{\frac{N}{2}-1} |T_k(f_i) - a \cdot T_k(i^2) - b \cdot T_k(i) - c \cdot T_k(1)|^2 \tag{8}$$

The calculation of the least-square method on the cepstrum axis, like the calculation on the frequency axis, may be performed by solving the simultaneous equations (3), (4) and (5). For the sake of simplicity, denoting is made such that $T_k(f_i)=F_k$, $T_k(i^2)=II_k$, $T_k(i)=I_k$ and $T_k(1)=O_k$. By solving the equation (3), equation (9) is obtained.

$$\sum_{k=0}^{\frac{N}{2}-1} [a \cdot |II_k|^2 - (Re(F_k)Re(II_k) + Im(F_k)Im(II_k)) + \tag{9}$$
$$b \cdot (Re(II_k)Re(I_k) + Im(II_k)Im(I_k)) +$$
$$c \cdot (Re(II_k)Re(O_k) + Im(II_k)Im(O_k))] = 0$$

where $R_e(F_k)$ represents the real part of $F_k$, and $I_m(F_k)$ represents the imaginary part of $F_k$. Likewise, by solving the equations (4) and (5), equations (10) and (11) are obtained.

$$\sum_{k=0}^{\frac{N}{2}-1} [b \cdot |I_k|^2 - (Re(F_k)Re(I_k) + Im(F_k)Im(I_k)) + \tag{10}$$
$$a \cdot (Re(II_k)Re(I_k) + Im(II_k)Im(I_k)) +$$
$$c \cdot (Re(I_k)Re(O_k) + Im(I_k)Im(O_k))] = 0$$

$$\sum_{k=0}^{\frac{N}{2}-1} [c \cdot |O_k|^2 - (Re(F_k)Re(O_k) + Im(F_k)Im(O_k)) + \tag{11}$$
$$a \cdot (Re(II_k)Re(O_k) + Im(II_k)Im(O_k)) +$$
$$b \cdot (Re(I_k)Re(O_k) + Im(I_k)Im(O_k))] = 0$$

where $\Pi_k$ and $I_k$ are expressed by equations (12) and (13).

$$\Pi_k = T_k(i^2) \qquad (12)$$

$$= \frac{(-1)^k}{2\sin^2\left(\frac{\pi k}{N}\right)}$$

$$I_k = T_k(i) \qquad (13)$$

$$= \frac{(-1)^k - 1}{2N\sin^2\left(\frac{\pi k}{N}\right)}$$

Since $F_k$ and $O_k$ are both real numbers, in the equations (9), (10) and (11) only the real parts may be considered. By solving the simultaneous equations (9), (10) and (11), equations (14), (15) and (16) are obtained.

$$a = \frac{\sum_{k=1}^{\frac{N}{2}-1}|I_k|^2\sum_{k=1}^{\frac{N}{2}-1}(F_k \cdot \Pi_k) - \sum_{k=1}^{\frac{N}{2}-1}(\Pi_k \cdot I_k)\sum_{k=1}^{\frac{N}{2}-1}(F_k \cdot I_k)}{\sum_{k=1}^{\frac{N}{2}-1}|I_k|^2\sum_{k=1}^{\frac{N}{2}-1}|\Pi_k|^2 - \sum_{k=1}^{\frac{N}{2}-1}(\Pi_k \cdot I_k)^2} \qquad (14)$$

$$b = \frac{\sum_{k=1}^{\frac{N}{2}-1}|\Pi_k|^2\sum_{k=1}^{\frac{N}{2}-1}(F_k \cdot I_k) - \sum_{k=1}^{\frac{N}{2}-1}(\Pi_k \cdot I_k)\sum_{k=1}^{\frac{N}{2}-1}(F_k \cdot \Pi_k)}{\sum_{k=1}^{\frac{N}{2}-1}|I_k|^2\sum_{k=1}^{\frac{N}{2}-1}|\Pi_k|^2 - \sum_{k=1}^{\frac{N}{2}-1}(\Pi_k \cdot I_k)^2} \qquad (15)$$

$$c = F_0 \qquad (16)$$

Actually, $O_k$ has a value only when k=0. At k=0, it is as in the following equation.

$$\hat{F}_k = 0$$

Thus, the fourth term in equation (7) can be neglected, and the equation (17) is given as a normalization equation.

$$\hat{F}_k = F_k - a\Pi_k - bI_k \qquad (17)$$

By substituting the equations (14) and (15) into the equation (17) and rearranging, equation (18) is obtained.

$$\hat{F}_k = F_k - Q_1 P_1 e\Pi_k + Q_2 P_2 e\Pi_k - Q_1 P_2 eI_k + Q_2 P_1 eI_k \qquad (18)$$

where, $$Q_1 = \frac{\sum_{k=1}^{\frac{N}{2}-1}|I_k|^2\sum_{k=1}^{\frac{N}{2}-1}|\Pi_k|^2}{\sum_{k=1}^{\frac{N}{2}-1}|I_k|^2\sum_{k=1}^{\frac{N}{2}-1}|\Pi_k|^2 - \sum_{k=1}^{\frac{N}{2}-1}(\Pi_k \cdot I_k)^2} \qquad (19)$$

$$Q_2 = \frac{\sqrt{\sum_{k=1}^{\frac{N}{2}-1}|I_k|^2\sum_{k=1}^{\frac{N}{2}-1}|\Pi_k|^2}\sum_{k=1}^{\frac{N}{2}-1}(\Pi_k \cdot I_k)}{\sum_{k=1}^{\frac{N}{2}-1}|I_k|^2\sum_{k=1}^{\frac{N}{2}-1}|\Pi_k|^2 - \sum_{k=1}^{\frac{N}{2}-1}(\Pi_k \cdot I_k)^2} \qquad (20)$$

$$P_1 = \sum_{k=1}^{N_c-1}(F_k \cdot e\Pi_k) \qquad (21)$$

$$P_2 = \sum_{k=1}^{N_c-1}(F_k \cdot eI_k) \qquad (22)$$

$$e\Pi_k = \frac{\Pi_k}{\sqrt{\sum_{k=1}^{\frac{N}{2}-1}|\Pi_k|^2}} \qquad (23)$$

$$eI_k = \frac{I_k}{\sqrt{\sum_{k=1}^{\frac{N}{2}-1}|I_k|^2}} \qquad (24)$$

Since the equations (19), (20), (23) and (24) are calculated and tabulated in advance, it is sufficient to perform calculations on the equations (21) and (22). Moreover, the number $N_c$ of orthogonal coefficients used as feature vectors is smaller than N, therefore it is sufficient to perform the calculation of $P_1$ and $P_2$ up to k=1~$N_c$. Normally, $N_c$ is approximately 10, while N is approximately 256. This means that normalization on the cepstrum axis permits great reduction of the amount of calculation. While the normalization with second order curve have been described, similar calculations may be performed on the cepstrum axis with a higher order curve.

Further, in case of the normalization with a second order curve with the center thereof fixed at a certain frequency of the cepstrum band, it is possible to derive the equation in a similar way. Denoting the fixed center frequency by M, the equation for normalization is given as equation (25).

$$\hat{F}_k = F_k - R_1 P_1 e\Pi_k - R_2 P_2 e\Pi_k - R_2 P_1 eI_k - R_e P_2 eI_k \qquad (25)$$

where, $$R_1 = \frac{\sum_{k=1}^{\frac{N}{2}-1}|\Pi_k|^2}{\sum_{k=1}^{\frac{N}{2}-1}(|\Pi_k|^2 + 4M^2|I_k|^2 - 4M(\Pi_k \cdot I_k))} \qquad (26)$$

$$R_2 = \frac{-2M\sqrt{\sum_{k=0}^{\frac{N}{2}-1}|\Pi_k|^2\sum_{k=0}^{\frac{N}{2}-1}|I_k|^2}}{\sum_{k=1}^{\frac{N}{2}-1}(|\Pi_k|^2 + 4M^2|I_k|^2 - 4M(\Pi_k \cdot I_k))} \qquad (27)$$

$$R_3 = \frac{4M^2\sum_{k=0}^{\frac{N}{2}-1}|I_k|^2}{\sum_{k=1}^{\frac{N}{2}-1}(|\Pi_k|^2 + 4M^2|I_k|^2 - 4M(\Pi_k \cdot I_k))} \qquad (28)$$

$P_1$, $P_2$, $e_{\Pi k}$ and $e_{Ik}$ are like those in the equations (21), (22), (23) and (24). Again in this case, since it is possible to calculate and tabulate $R_1$, $R_2$, $R_3$, $e_{\Pi k}$ and $e_{Ik}$ in advance, the sole calculation of the inner product part is performed at the time of the operation of recognition.

Further, in case when one half of the cepstrum band is coincident with the center of the curve, it may set as M=N/4. In this case, the equation of normalization is given as equation (29).

$$\hat{F}_k = F_k - (U_1 P_1 - {}^N_2 U_2 P_2) e_{Lk} \tag{29}$$

where, $$e_{L_k} = \frac{L_k}{\sqrt{\sum_{k=1}^{\frac{N}{2}-1} |L_k|^2}} \tag{30}$$

$$L_k = \frac{(-1)^k + 1}{4N \sin^2\left(\frac{\pi k}{N}\right)} \tag{31}$$

$$U_1 = \frac{\sqrt{\sum_{k=1}^{\frac{N}{2}-1} |II_k|^2 \sum_{k=1}^{\frac{N}{2}-1} |L_k|^2}}{\sum_{k=1}^{\frac{N}{2}-1} \left(|II_k|^2 + \frac{N^2}{4} |I_k|^2 - N(II_k \cdot I_k)\right)} \tag{32}$$

$$U_2 = \frac{\sqrt{\sum_{k=1}^{\frac{N}{2}-1} |II_k|^2 \sum_{k=1}^{\frac{N}{2}-1} |L_k|^2}}{\sum_{k=1}^{\frac{N}{2}-1} \left(|II_k|^2 + \frac{N^2}{4} |I_k|^2 - N(II_k \cdot I_k)\right)} \tag{33}$$

$P_1$ and $P_2$ are like those in the equations (21) and (22).

Again in this case, since it is possible to calculate and tabulate $U_1$, $U_2$ and $e_{Lk}$ in advance, the sole calculation of the inner product part is sufficient at the time of the recognition operation. For k in an odd term $\hat{F}_k = F_k$, accordingly only the calculation when k is an even number is required, reducing further amount of calculations.

In case when the logarithmic spectrum normalization has an aim of fixed line characteristic normalization, the normalization may be performed from the entirety of input. Denoting the frame number by t (t=0~T−1) and the inner product of the entirety of input by, $$\bar{P}_1, \bar{P}_2$$

equations (34) and (35) are obtained.

$$\bar{P}_1 = \frac{\sum_{t=0}^{T-1} P_1(t)}{T} \tag{34}$$

$$\bar{P}_2 = \frac{\sum_{t=0}^{T-1} P_2(t)}{T} \tag{35}$$

Thus obtained inner product is substituted into $P_1$ and $P_2$ in the equations (18) and (25) for the normalization.

In case where dynamic line characteristic fluctuation is conceivable, the inner product value may be updated regressively as follows. Representing the updated inner products as in, $$\hat{P}_1(t), \hat{P}_2(t)$$

equations (36) and (37) are obtained.

$$\hat{P}_1(t) = (1-\alpha)\hat{P}_1(t-1) + \alpha P_1(t) \tag{36}$$

$$\hat{P}_2(t) = (1-\alpha)\hat{P}_2(t-1) + \alpha P_2(t) \tag{37}$$

Where $\alpha$ is a coefficient taking a positive value in a range of $\alpha=0$~$1$. In this calculation, when $\alpha$ is small, great relative weight is set for the past inner products, while when $\alpha$ is large, great relative weight is set for the present inner products. Thus inner products are substituted into $P_1$ and $P_2$ in the equations (18) and (25) for the normalization. In this case, it is necessary to store only the inner products preceding by one frame. Thus, not only it is necessary to store a small amount of data, but processing synchronized to the input is realized.

Figure 1:
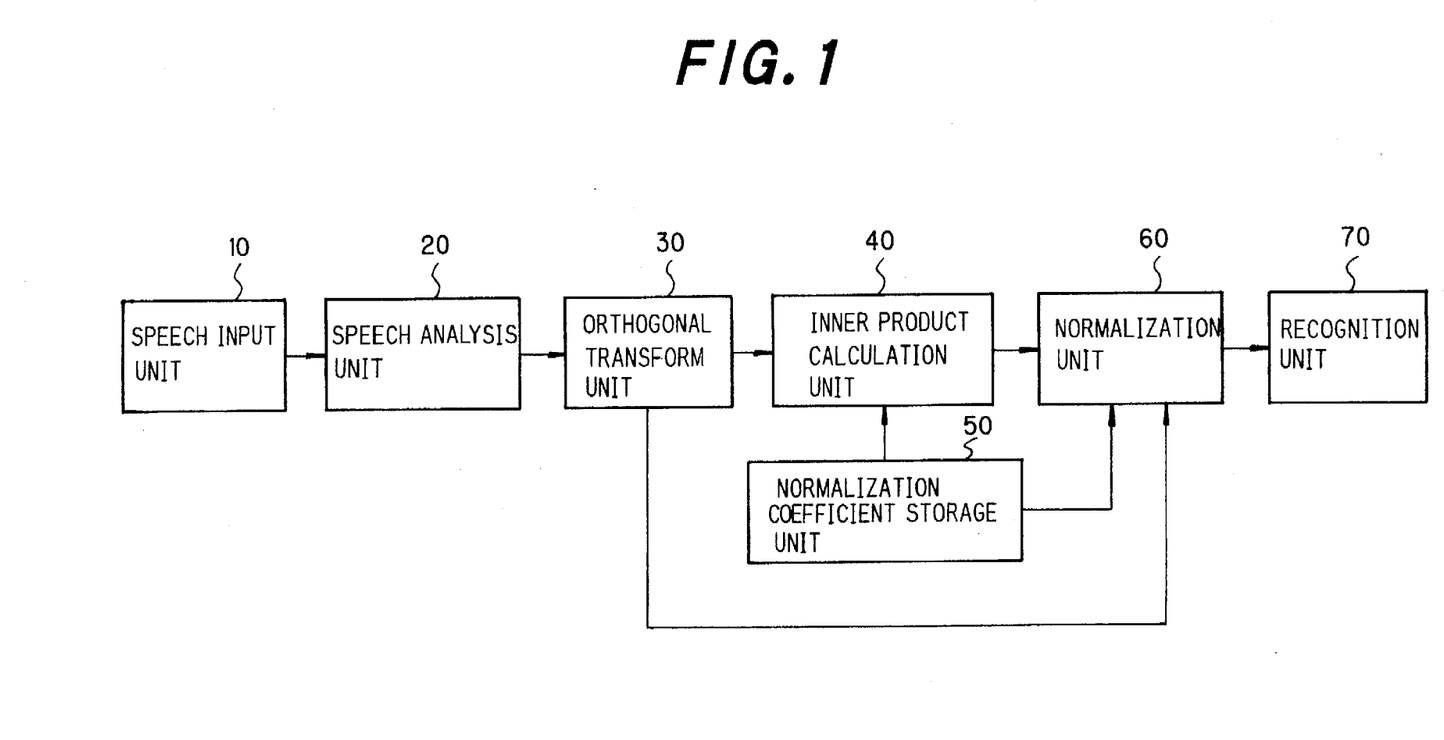
FIG. 1 is a block diagram of a speech recognition apparatus according to one aspect of the present invention.

FIG. 1 is a block diagram showing one embodiment of the present invention. The speech recognition apparatus according to the present invention will now be described with reference to FIG. 1.

First, a normalization method will be described, in which the inner product value is updated regressively, and a second order curve (which is not fixed at the center) is used. This embodiment is hereinafter referred to as Embodiment 1.

Speech data is entered to a speech input unit 10 to be supplied to a speech analysis unit 20. The speech analysis unit 20 performs logarithmic spectrum transformation of the supplied waveform (speech data) and supplies the transformed data to an orthogonal transformation unit 30. Examples of the transformation are Fourier transformation (Furui, "Digital Speech Processing", Tokai University Publishing Society, pp. 44–47, 1985, hereinafter referred to as Literature 3) and cosine transformation (Hino, "Spectrum Analysis", Asakura Bookstore, pp. 62–63, 1977, hereinafter referred to as Literature 4).

The orthogonal transformation unit 30 converts the logarithmic spectrum into feature vector by the orthogonal transformation. Here, cosine transformation is used as the orthogonal transformation, but other orthogonal transformations may be employed. Thus obtained feature vector is supplied to an inner product calculation unit 40 and a normalization unit 60.

The inner product calculation unit 40 will now be described under the assumption that the symbols are the same as those described in the above. The cepstrum $F_k$ (k=1~N−1) supplied to the inner product calculation unit 40 is used together with the unit vectors $e_{IIk}$ and $e_{Ik}$ stored in a normalization coefficient storage unit 50 for the inner product calculation. Denoting the frame number by t, the inner product calculation is performed according to equations (38) and (39).

$$P_1(t) = \sum_{k=1}^{N-1} (F_k \cdot e_{II_k})_t \tag{38}$$

$$P_2(t) = \sum_{k=1}^{N-1} (F_k \cdot e_{I_k})_t \tag{39}$$

Thus calculated inner products of the individual frames are successively supplied to a normalization unit 60.

The normalization unit 60 performs inner product updating regressively by using the inner product supplied from the inner product calculation unit 40. When t=0, equations (40) and (41) are obtained.

$$\hat{P}_1(0) = P_1(0) \tag{40}$$

$$\hat{P}_2(0) = P_2(0) \tag{41}$$

The inner products represented by, $$\hat{P}_1(0), \hat{P}_2(0)$$

is stored in the normalization unit 60. when $t \geq 1$, regressive inner product updating is performed using the stored inner products preceding by one frame as represented by, $\hat{P}_1(t-1), \hat{P}_2(t-1)$ and the inner products $P_1(t)$ and $P_2(t)$ of the present frame calculated in the inner product calculation unit 40 according to equations (36) and (37). The updated inner products represented by, $\hat{P}_1(t), \hat{P}_2(t)$ are stored in the normalization unit 60. In the regressive calculation, it is necessary to store only the inner product preceding by one frame. Subsequently, calculations according to equations (42), (43), (44) and (45) are performed by using the normalization coefficients $Q_1$, $Q_2$ and unit vectors $e_{IIk}$, $e_{Ik}$ supplied from the normalization coefficient storage unit 50 and the updated inner products represented by, $\hat{P}_1(t), \hat{P}_2(t)$ $$A_k = Q_1 \hat{P}_1(t) e_{IIk} \qquad (42)$$

$$B_k = Q_2 \hat{P}_2(t) e_{IIk} \qquad (43)$$

$$C_k = Q_1 \hat{P}_2(t) e_{Ik} \qquad (44)$$

$$D_k = Q_2 \hat{P}_1(t) e_{Ik} \qquad (45)$$

Subsequently, normalization is performed by using the calculated data $A_k$ to $D_k$ and the feature vector data $F_k$ supplied from the orthogonal transformation unit 30. Here, the calculation is performed according to equation (46).

$$\hat{F}_k = F_k - A_k + B_k - C_k + D_k \qquad (46)$$

While the above calculation is performed for the frame t, actually normalizing calculation for frames 0~T-1 is performed successively, and the normalized cepstrum is successively supplied to a recognition unit 70.

The recognition unit 70 performs speech recognition based on the normalized cepstrum, $\hat{F}_k$ The speech recognition is performed based on the forward pass algorithm (Nakagawa, "Speech Recognition by Probability Models", The Institute of Electronics, Information and Communication Engineers, pp, 40–44, 1988, hereinafter referred to as Literature 5), Viterbi algorithm (Nakagawa, "Speech RecognitiOn by Probability Models", The Institute of Electronic, Information and Communication Engineers, pp 44–46, 1988, hereinafter referred to as Literature 6). and etc. while the description so far as concerned with speech recognition using sole cepstrum, it is possible to use Δ cepstrum (Furui, "Speaker-independent Isolated Word Recognition Using Dynamic Features of Speech Spectrum", IEEE Trans. Acoust., Speech Signal Processing, vol. ASS P-34, pp. 52–59, 1986, hereinafter referred to as Literature 7) besides the normalized feature vector.

Now, an example of normalizing method will be described, in which regressive inner product updating is performed, and the second order curve having the center thereof fixed at a certain frequency is used. This embodiment will be hereinafter referred to as Embodiment 2. Like Embodiment 1, the description will be made with reference to FIG. 1. The operation is the same as in Embodiment 1 up to the inner product calculation unit 40. The calculated inner products $P_1(t)$ and $P_2(t)$ obtained in the inner product calculation unit 40 is supplied to the normalization unit 60.

Then, the normalization unit 60 performs regressive inner product updating by using the inner products $P_1(t)$ and $P_2(t)$ supplied from the inner product calculating unit 40 and the inner products preceding by one frame as represented by, $\hat{P}_1(t-1), \hat{P}_2(t-1)$ (49) and (50)

$$E_k = R_1 \hat{P}_1(t) e_{IIk} \qquad (47)$$

$$V_k = R_2 \hat{P}_2(t) e_{IIk} \qquad (48)$$

$$G_k = R_2 \hat{P}_1(t) e_{Ik} \qquad (49)$$

$$H_k = R_3 \hat{P}_2(t) e_{Ik} \qquad (50)$$

is performed by using the updated inner products represented by, $\hat{P}_1(t), \hat{P}_2(t)$ and the normalization coefficients $R_1$, $R_2$, $R_3$ and unit vectors $e_{IIk}$, $e_{Ik}$ stored in the normalization coefficient storage unit 50. Then, the normalization is performed based on the calculated data $E_k$, $V_k$, $G_k$, $H_k$ and $F_k$ supplied from the orthogonal transformation unit 30. According to equation (51).

$$\hat{F}_k = F_k - E_k - V_k - G_k - H_k \qquad (51)$$

The above calculation is performed successively for t=0~T-1. The normalized cepstrum thus obtained are supplied successively to the recognition unit 70. The calculations in the recognition unit 70 are similar to those in Embodiment 1.

Now, a further example of the normalizing method will be described, in which the regressive inner product is updated, and a second order curve having the center point coincident with one half the cepstrum band is used. This embodiment will be hereinafter referred to as Embodiment 3. Like Embodiments 1 and 2, the description will be made with reference to FIG. 1. The operation is the same as in Embodiments 1 and 2 up to the inner product calculation unit 40. The calculated inner products $P_1(t)$ and $P_2(t)$ in the inner product calculation unit 40 are supplied to the normalization unit 60.

Then, the normalization unit 60 makes regressive inner product updating by using inner products $P_1(t)$ and $P_2(t)$ supplied from the inner products calculation unit 40 and the inner products preceding by one frame as represented by, $\hat{P}_1(t-1), \hat{P}_2(t-1)$ stored therein.
Then, calculation on equation (52)

$$J_k = \left( U_1 \hat{P}_1(t) - \frac{N}{2} U_2 \hat{P}_2(t) \right) e_{I_k} \qquad (52)$$

is performed by using the updated inner products represented by, $\hat{P}_1(t), \hat{P}_2(t)$ and the normalization coefficients $U_1$, $U_2$ and unit vectors $e_{IIk}$, $e_{Ik}$, $e_{Lk}$ stored in the normalization coefficient storage unit 50. Then, by using the calculated $J_k$ and $F_k$ supplied from the orthogonal transformation unit 30, the normalization is performed according to equation (53).

$$\hat{F}_k = F_k - J_k \qquad (53)$$

The above calculation is performed successively for $t=0\sim T-1$. The normalized cepstrum thus obtained is successively supplied to the recognition unit 70. The calculations in the recognition unit 70 are the same as those in the previous Embodiments 1 and 2.

Figure 2:
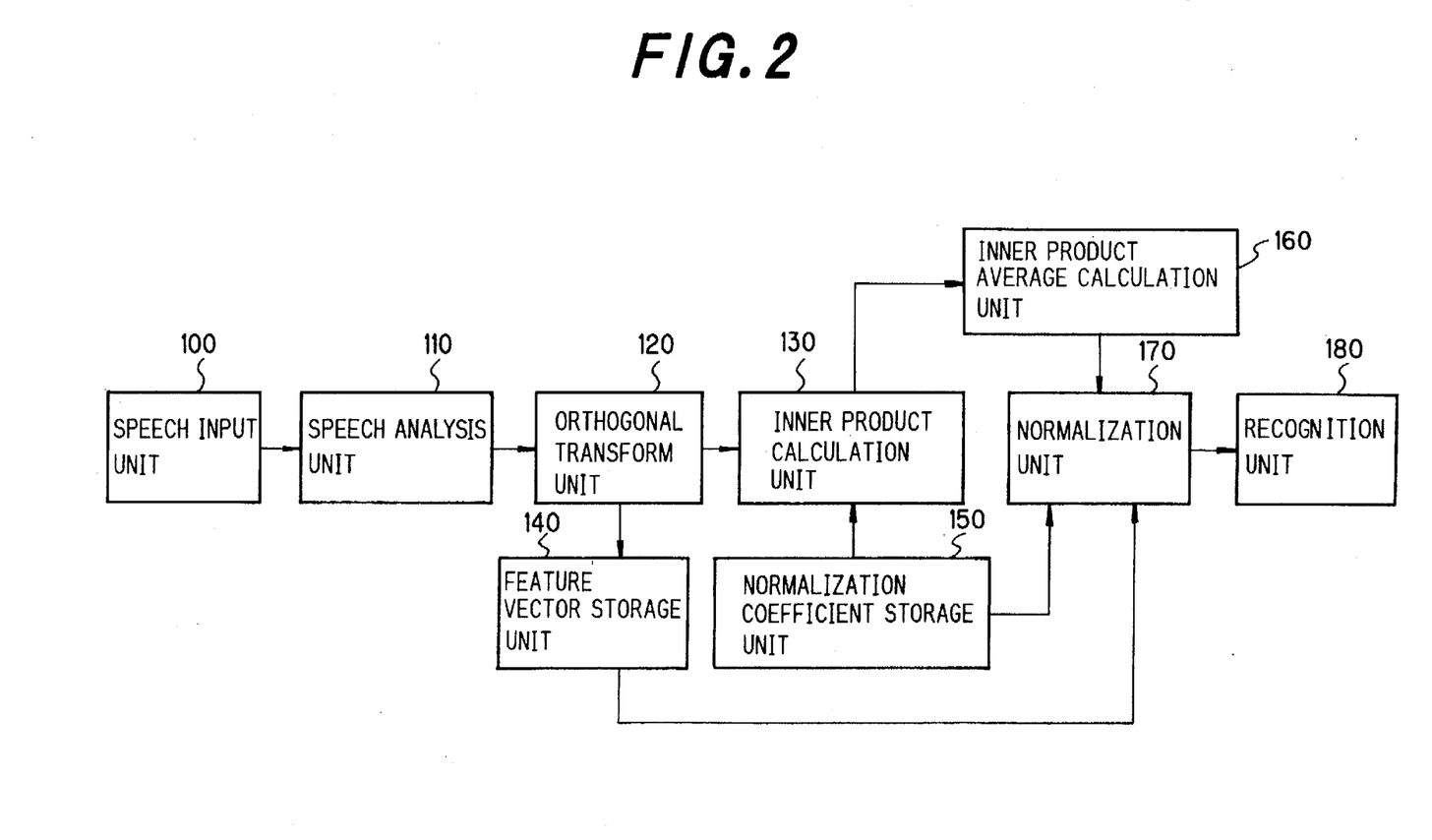
FIG. 2 is a block diagram of a speech recognition apparatus according to another aspect of the present invention.

Now, an example of method, in which inner product calculation is performed for a predetermined section, and a second order curve (without fixed center) is used, will be described with reference to FIG. 2. Here, the predetermined section corresponds to a word, but it may correspond to a phoneme or a sentence as well. This embodiment will be hereinafter referred to as Embodiment 4. Calculations as those in the orthogonal transformation unit 30 in the Embodiments 1 to 3 are made up to an orthogonal transformation unit 120 as shown. The obtained feature vector from the orthogonal transformation unit 120 is supplied to an inner product calculation unit 130 and a feature vector storage unit 140.

The inner product calculation unit 130 performs inner product calculation by using the feature vectors supplied from the orthogonal transformation unit 120 and unit vectors stored in the normalization coefficient storage unit 150. The calculated inner products $P_1(t)$ and $P_2(t)$ of the individual frames in the inner products calculation unit 130 is successively supplied for additive coupling to an inner product average calculation unit 160. After the inner product calculation for $t=T-1$, the averages of the inner products of the entire word as represented by, $$\bar{P}_1, \bar{P}_2$$

are calculated according to equations (34) and (35).

The averages of the inner product of the entire word represented by, $$\bar{P}_1, \bar{P}_2$$

calculated in the inner product average calculation unit 160 and the normalization coefficients $Q_1$, $Q_2$ and unit vectors $e_{IIk}$ and $e_{Ik}$ are supplied to a normalization unit 170. The normalization unit 170 performs calculation on equations (54), (55), (56) and (57), $$\bar{A}_k = Q_1 \bar{P}_1 e_{IIk} \qquad (54)$$

$$\bar{B}_k = Q_2 \bar{P}_2 e_{IIk} \qquad (55)$$

$$\bar{C}_k = Q_1 \bar{P}_2 e_{Ik} \qquad (56)$$

$$\bar{D}_k = Q_2 \bar{P}_1 e_{Ik} \qquad (57)$$

by using inner product averages $P_1$ and $P_2$ supplied from the inner product average calculation unit 160 and normalization coefficients $Q_1$, $Q_2$, and unit vectors $e_{IIk}$, $e_{Ik}$ supplied from the normalization coefficient storage unit 150. Then, it performs normalization successively on equation (58), $$\hat{F}_k = F_k(t) - \bar{A}_k + \bar{B}_k - \bar{C}_k + \bar{D}_k \qquad (58)$$

by using the cepstrum $F_k(t)$ ($t=0\sim T-1$) stored in the feature vector storage unit 140 and the following calculated terms, $$\bar{A}_k, \bar{B}_k, \bar{C}_k, \bar{D}_k$$

The normalized cepstrum is successively supplied to a recognition unit 180. The recognition unit 180 performs calculations like those in the recognition unit 70 in Embodiments 1, 2 and 3.

Now, an example of method Will be described, in which inner product calculation is performed for each word, and a second order curve with the center thereof fixed at a certain location in the cepstrum band is used. This embodiment is hereinafter referred to as Embodiment 5. Calculations like those in the inner product calculation unit 130 in Embodiment 4 are performed up to the inner product calculation unit 130.

The inner products $P_1(t)$ and $P_2(t)$ of the individual frames calculated in the inner product calculation unit 130 are supplied and additively coupled to the inner product average calculation unit 160. After the inner product calculation for $t=T-1$, the inner product average of the entire word as represented by, $$\bar{P}_1, \bar{P}_2$$

are calculated according to equations (34) and (35).

The inner product averages of the entire word represented by, $$\bar{P}_1, \bar{P}_2$$

calculated in the inner product average calculation unit 160 and the normalization coefficients $R_1$, $R_2$, $R_3$ and unit vectors $e_{IIk}$ and $e_{Ik}$ stored in the normalization coefficient storage unit 150 are supplied to the normalization unit 170.

The normalization unit 170 performs calculation on equations (59), (60), (61) and (62) by using inner product average represented by, $$\bar{P}_1, \bar{P}_2$$

supplied from the inner product average calculation unit 160 and the normalization coefficients $R_1$, $R_2$, $R_3$ and unit vectors $e_{IIk}$ and $e_{Ik}$ supplied from the normalization coefficient storage unit 150.

$$\bar{E}_k = R_1 \bar{P}_1 e_{IIk} \qquad (59)$$

$$\bar{V}_k = R_2 \bar{P}_2 e_{IIk} \qquad (60)$$

$$\bar{G}_k = R_2 \bar{P}_1 e_{Ik} \qquad (61)$$

$$\bar{H}_k = R_3 \bar{P}_2 e_{Ik} \qquad (62)$$

Then, it performs normalization successively on equation (63)

$$\hat{F}_k = F_k(t) - \bar{E}_k - \bar{V}_k - \bar{G}_k - \bar{H}_k \qquad (63)$$

by using the cepstrum $F_k(t)$ stored in the feature vector storage unit 140 and the calculated data represented by, $$\bar{E}_k, \bar{V}_k, \bar{G}_k, \bar{H}_k$$

The normalized cepstrum is successively supplied to a recognition unit 180. Calculations in the recognition unit 180 are performed like those in the previous Embodiment 4.

Now, an example of method, in which inner product calculation is performed for each word, and a second order curve with the center thereof coincident with one half the frequency band is used, will be described with reference to FIG. 2. This embodiment is referred to as Embodiment 6. Calculations like those in the inner product calculation unit 130 in Embodiments 4 and 5 are performed up to the inner product calculation unit 130. The inner products $P_1(t)$ and $P_2(t)$ in the individual frames calculated in the inner product calculation unit 130 are successively supplied and additively coupled to the inner product average calculation unit 160. At the end of the inner product calculation for $t=T-1$, the inner product average of the entire word as represented by, $$\bar{P}_1, \bar{P}_2$$

are calculated according to the equations (34) and (35).

The inner product averages of the entire word represented by, $$\bar{P}_1, \bar{P}_2$$

calculated in the inner product average calculation unit 160 and the normalization coefficients $U_k$ and unit vectors data $e_{IIk}, e_{Ik}, e_{IK}$ stored in the normalization coefficient storage unit 150 are supplied to the normalization unit 170. The normalization unit 170 performs calculation on equation (64)

$$\bar{J}_k = \left( U_1 \bar{P}_1 - \frac{N}{2} U_2 \bar{P}_2 \right) e_{L_k} \quad (64)$$

by using the following inner product averages, $$\bar{P}_1, \bar{P}_2$$

supplied from the inner product average calculation unit 160, the normalization coefficients $U_1, U_2$ supplied from the normalization coefficient storage unit 150 and unit vectors $e_{IIk}, e_{Ik}, e_{Lk}$. Then, it performs normalization according to the following equation (65) successively by using the cepstrum $F_k(t)$ stored in the feature vector storage unit 140 and the calculated data represented by, $$\bar{J}_k$$

$$F'_k = F_k(t) - \bar{J}_k \quad (65)$$

The normalized cepstrum is successively supplied to the recognition unit 180. Calculations in the recognition unit 180 are performed like those in Embodiments 4 and 5.

According to the present invention, it is possible to obtain a speech recognition apparatus capable of performing with less calculation amount in the normalization and permitting high recognition rate even in case of complicated frequency characteristics.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A speech recognition apparatus comprising:

a speech data input unit for inputting speech data;

a speech data analysis unit for converting the speech data input from the speech data input unit into logarithmic spectrum data;

an orthogonal transformation unit for performing orthogonal transformation of the logarithmic spectrum data obtained in the speech data analysis unit to develop feature vectors;

a normalization coefficient storage unit for storing normalization coefficient data and unit vector data;

an inner product calculation unit for performing an inner product calculation of the feature vectors obtained in the orthogonal transformation unit and the unit vector data stored in the normalization coefficient storage unit;

a normalization unit for regressively updating the inner product calculated in the inner product calculation unit and performing normalization of the feature vectors by subtracting a normalization vector, which corresponds to a curve of the second or higher order on a logarithmic spectrum space, from the feature vectors by using the updated inner product, the normalization coefficient data and unit vector data stored in the normalization coefficient storage unit and the feature vectors calculated in the orthogonal transformation unit; and a recognition unit for recognizing the speech based on the normalized feature vectors.

2. The speech recognition apparatus according to claim 1, wherein the normalization is performed with an even order curve of the second or higher order having a center thereof fixed at a certain location on the logarithmic spectrum space.

3. The speech recognition apparatus according to claim 2, wherein the normalization is performed with one half of a band of the logarithmic spectrum space coincident with a center of the even order curve of the second or higher order.

4. A speech recognition apparatus comprising:

a speech data input unit for inputting speech data;

a speech data analysis unit for converting the speech data input from the speech data input unit into logarithmic spectrum data;

an orthogonal transformation unit for performing orthogonal transformation of the logarithmic spectrum data obtained in the speech data analysis unit to develop feature vectors;

a feature vector storage unit for storing a predetermined section of the feature vectors developed by the orthogonal transformation unit;

a normalization coefficient storage unit for storing normalization coefficient data and unit vector data;

an inner product calculation unit for performing an inner product calculation of the feature vectors obtained in the orthogonal transformation unit and the unit vector data stored in the normalization coefficient storage unit;

an inner product average calculation unit for calculating an average of the inner products calculated in the inner product calculation unit for a predetermined section;

a normalization unit for normalizing the feature vectors with a normalization vector, which corresponds to a curve of the second or higher order on a logarithmic spectrum space by using the inner product average calculated by the inner product average calculation unit, the normalization coefficient data and unit vector data stored in the normalization coefficient storage unit and the feature vectors stored in the feature vector storage unit; and a recognition unit for recognizing the speech based on the normalized feature vectors.

5. The speech recognition apparatus according to claim 2, wherein the normalization is performed with an even order curve of the second or higher order having a center thereof fixed at a certain location on the logarithmic spectrum space.

6. The speech recognition apparatus according to claim 5, wherein the normalization is performed with one half of a band of the logarithmic spectrum space coincident with a center of the even order curve of the second or higher order.

7. A speech recognition method comprising the steps of:

converting a speech data into logarithmic spectrum data and orthogonally transforming the logarithmic spectrum data into feature vectors;

calculating an inner product of the feature vectors and unit vector data;

performing a normalization of the inner product by regressively updating the inner product and performing spectrum normalization of the feature vectors by subtracting a normalization vector, which corresponds to a curve of the second or higher order on a logarithmic spectrum space, from the feature vectors by using the updated inner product, the normalization coefficient data and unit vector data and the feature vectors; and recognizing the speech based on the normalized feature vectors.

8. A speech recognition method comprising the steps of:

converting a speech data into logarithmic spectrum data and orthogonally transforming the logarithmic spectrum data into feature vectors;

calculating an inner product of the feature vectors and unit vector data;

calculating an average of the inner products for a predetermined section of the feature vectors;

performing a normalization of the feature vectors obtained after the orthogonal transformation by regressively updating the inner product by using the inner product average, normalization coefficient data and unit vector data and the feature vectors; and recognizing the speech based on the normalized feature vectors.

* * * * *